(12) United States Patent
Hong et al.

(10) Patent No.: US 10,705,757 B2
(45) Date of Patent: Jul. 7, 2020

(54) MEMORY INTERFACE, MEMORY CONTROLLER HAVING THE MEMORY INTERFACE, AND MEMORY SYSTEM HAVING THE MEMORY CONTROLLER

(71) Applicant: SK hynix Inc., Gyeonggi-do (KR)

(72) Inventors: Sung Kwan Hong, Seoul (KR); Ik Sung Oh, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/119,575

(22) Filed: Aug. 31, 2018

(65) Prior Publication Data
US 2019/0227736 A1 Jul. 25, 2019

(30) Foreign Application Priority Data
Jan. 19, 2018 (KR) ........................ 10-2018-0007195

(51) Int. Cl.
*G06F 3/06* (2006.01)
*G06F 12/02* (2006.01)

(52) U.S. Cl.
CPC ............ *G06F 3/0655* (2013.01); *G06F 3/061* (2013.01); *G06F 3/0604* (2013.01); *G06F 3/0659* (2013.01); *G06F 3/0673* (2013.01); *G06F 3/0679* (2013.01); *G06F 12/02* (2013.01)

(58) Field of Classification Search
CPC ............................ G06F 3/0679; G06F 3/0659
See application file for complete search history.

(56) References Cited

U.S. PATENT DOCUMENTS

2008/0104283 A1 5/2008 Shin et al.
2013/0279283 A1* 10/2013 Seo ................... G11C 11/40611
365/222

FOREIGN PATENT DOCUMENTS

KR 1020150017526 2/2015

\* cited by examiner

*Primary Examiner* — Edward J Dudek, Jr.
(74) *Attorney, Agent, or Firm* — IP & T Group LLP

(57) ABSTRACT

There are provided a memory interface, a command queue controller configured to determine an execution order of normal commands and a suspend command; a command time controller configured to receive the normal commands, and output command and time information by providing a corresponding additional operation time to each of the normal commands; a command time manager configured to match the command and time information to each of the normal commands to be stored therein, and output an end signal; and an input/output interface configured to receive the normal commands and the suspend command, and transmit the normal commands and the suspend command to a memory device through a channel.

19 Claims, 7 Drawing Sheets

MEMORY INTERFACE, MEMORY CONTROLLER HAVING THE MEMORY INTERFACE, AND MEMORY SYSTEM HAVING THE MEMORY CONTROLLER

CROSS-REFERENCE TO RELATED APPLICATION

The present application claims priority under 35 U.S.C. § 119(a) to Korean patent application number 10-2018-0007195, filed on Jan. 19, 2018, which is incorporated herein by reference in its entirety.

BACKGROUND

1. Field of Invention

Various embodiments of the present disclosure generally relate to a memory interface, a memory controller having the memory interface, and a memory system having the memory controller. More particularly, the embodiments of the present disclosure relate to a memory interface for managing commands, a memory controller having the memory interface, and a memory system having the memory controller.

2. Description of the Related Art

Generally, a memory system may include a memory device and a memory controller.

The memory device may store data or output the stored data. For example, the memory device may be configured as a volatile memory device in which stored data is lost when power supply is lost, or be configured as a nonvolatile memory device in which stored data is retained even when the power supply is lost.

The memory controller may control data communication between a host and the memory device.

The host may communicate with the memory device through the memory controller by using an interface protocol such as peripheral component interconnect-express (PCI-E), advanced technology attachment (ATA), serial ATA (SATA), parallel ATA (PATA), or serial attached SCSI (SAS). Interface protocols between the host and the memory system are not limited to the above-described examples, and may include various interface protocols such as a universal serial bus (USB), a multi-media card (MMC), an enhanced small disk interface (ESDI), and integrated drive electronics (IDE).

SUMMARY

Embodiments of the present disclosure provide a memory interface for managing commands such as a normal command, and a suspend command, a memory controller having the memory interface, and a memory system having the memory controller.

According to an aspect of the present disclosure, there is provided a memory interface including: a command queue controller configured to determine an execution order of normal commands and a suspend command; a command time controller configured to receive the normal commands, and output command and time information by providing a corresponding additional operation time to each of the normal commands; a command time manager configured to match the command and time information to each of the normal commands to be stored therein, and output an end signal; and an input/output interface configured to receive the normal commands and the suspend command, and transmit the normal commands and the suspend command to a memory device through a channel.

According to an aspect of the present disclosure, there is provided a memory controller including: a central processing unit configured to generate a normal command and a suspend command in response to a request from a host; and a memory interface configured to transmit the normal command or the suspend command to a memory device, wherein the memory interface: if the normal command is received, provides an additional operation time to the normal command and transmits the normal command to the memory device; and if the suspend command is received, executes the normal command for the additional operation time and transmits the suspend command to the memory device.

According to an aspect of the present disclosure, there is provided a memory system including: a memory device configured to store data; and a memory controller configured to generate a normal command or a suspend command in response to a request from a host, and transmit the normal command or the suspend command to the memory device through a channel, wherein the memory controller: provides an additional operation time to the normal command and then transmits the normal command to the memory device, if the normal command is generated; and delays the suspend command for the additional operation time and then transmits the suspend command to the memory device, if the suspend command is generated.

According to an aspect of the present disclosure, there is provided a memory system including: a memory device; and a memory controller configured to operate the memory device based on a normal command and a suspend command from a host, wherein the memory controller is configured to: if the suspend command is received while performing an operation for the memory device in response to the normal command, delay the suspend command for a predetermined operation time, and additionally perform the operation for the normal command for the predetermined operation time.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art. It is noted that reference to "an embodiment" does not necessarily mean only one embodiment, and different references to "an embodiment" are not necessarily to the same embodiment(s).

In the drawings, dimensions of the figures may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 1:
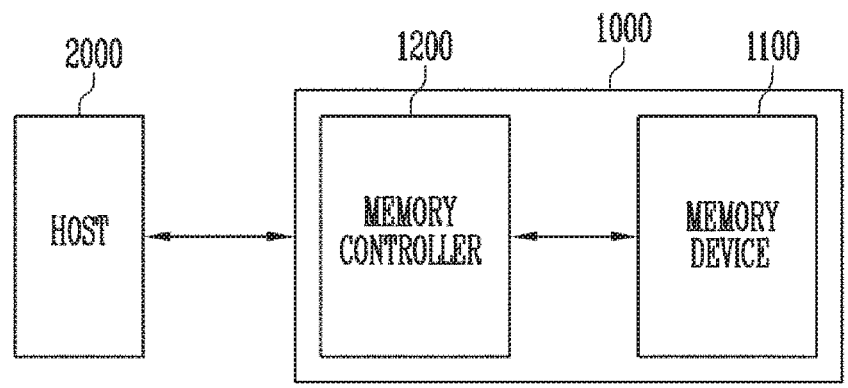
FIG. 1 is a diagram illustrating a memory system according to an embodiment of the present disclosure.

FIG. 1 is a diagram illustrating a memory system 1000 according to an embodiment of the present disclosure.

Referring to FIG. 1, the memory system 1000 may include a memory device 1100 for storing data and a memory controller 1200 for controlling the memory device 1100 under the control of a host 2000.

The host 2000 may communicate with the memory system 1000 by using an interface protocol such as Peripheral Component Interconnect-Express (PCI-E), Advanced Technology Attachment (ATA), Serial ATA (SATA), Parallel ATA (PATA), or Serial Attached SCSI (SAS). Interface protocols between the host 2000 and the memory system 1000 are not limited to the above-described examples, and may further include interface protocols such as a Universal Serial Bus (USB), a Multi-Media Card (MMC), an Enhanced Small Disk Interface (ESDI), and Integrated Drive Electronics (IDE).

The memory controller 1200 may control overall operations of the memory system 1000, and control data exchange between the host 2000 and the memory device 1100. For example, the memory controller 1200 may modify received information such that commands, addresses, and data can be communicated between the host 2000 and the memory device 1100, and store and output the modified information.

For example, the memory controller 1200 may control the memory device 1100 to perform a program, read, or erase operation. By way of example and not limitation, the memory device 1100 may include a volatile memory such as a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), and a non-volatile memory such as a flash memory.

The memory controller 1200 may sequentially execute normal commands that are generally executed according to a command queue. Also, the memory controller 1200 may control the memory device 1100 such that a specific operation is performed prior to the normal commands, using a suspend command. Therefore, the suspend command is preferentially executed regardless of the queue of the normal commands. The memory controller 1200 may provide an additional operation time for each of the normal commands, and control the normal commands such that an operation corresponding to each of the normal commands is further performed during the additional operation time when the suspend command is executed.

Figure 2:
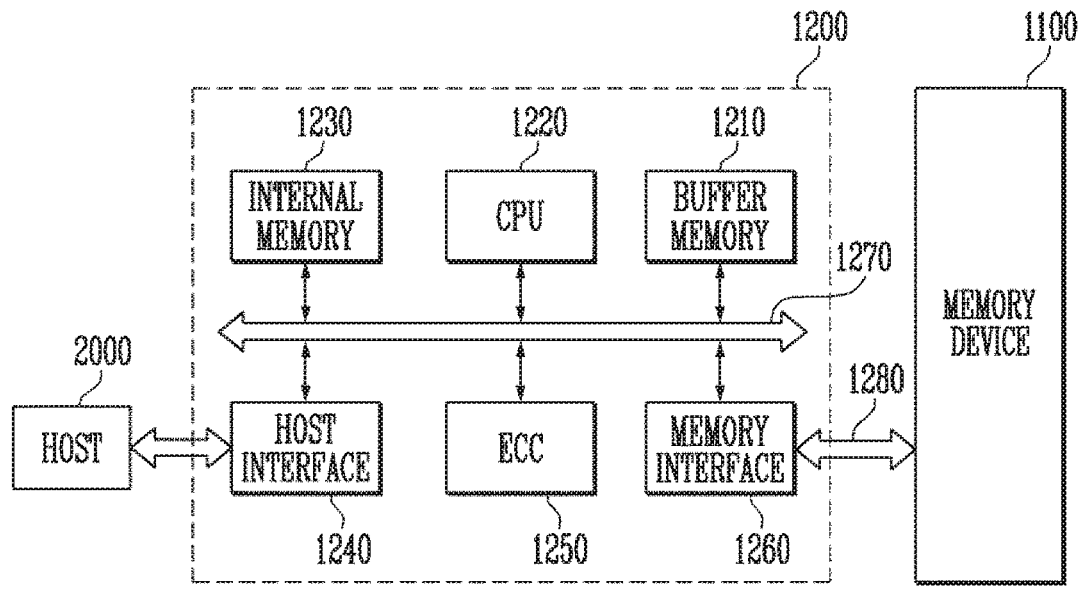
FIG. 2 is a diagram illustrating a memory controller according to an embodiment of the present disclosure.

FIG. 2 is a diagram illustrating a memory controller according to an embodiment of the present disclosure, for example, the memory controller 1200 of FIG. 1.

Referring to FIG. 2, the memory controller 1200 may include a buffer memory 1210, a central processing unit (CPU) 1220, an internal memory 1230, a host interface 1240, an error correction code (ECC) circuit 1250, and a memory interface 1260 that controls communication between the host 2000 and the memory device 1100. The buffer memory 1210, the CPU 1220, the internal memory 1230, the host interface 1240, the ECC circuit 1250, and the memory interface 1260 may communicate with each other through a bus 1270. The memory interface 1260 may communicate with the memory device 1100 through a channel 1280.

The buffer memory 1210 may temporarily store data communicated between the memory controller 1200 and the memory device 1100. For example, in a program operation, data to be programmed may be temporarily stored in the buffer memory 1210 before the data is transmitted to the memory device 1100. At this time, the stored data may be re-used when the program operation fails in the memory device 1100. In a read operation, data read from the memory device 1100 may be temporarily stored in the buffer memory 1210. For example, if read data having a fixed size is temporarily stored in the buffer memory 1210, the read data may be output to the host 2000 through the host interface 1240.

The CPU 1220 may perform various operations or firmware for controlling the memory device 1100. The CPU 1220 may generate normal commands in response to normal requests received from the host 2000, or generate a suspend command in response to a suspend request received from the host 2000.

The internal memory 1230 may be used as a storage device capable of storing various system information required to perform an operation of the memory controller 1200. For example, the internal memory 1230 may be implemented with a static random access memory (SRAM). The internal memory 1230 may include a table in which various system information required to perform an operation of the memory system 1000 are stored.

The host interface 1240 may communicate with the host 2000 coupled to the memory system 1000 under the control of the CPU 1220. For example, the host interface 1240 may receive a write command, data, and a logical address corresponding to the write command from the host 2000. For another example, the host interface 1240 may receive a read command and a logical address corresponding to the read command from the host 2000.

The ECC circuit 1250 may detect or correct an error included in data read from the memory device 1100. For example, the ECC circuit 1250 may perform an error correction code (ECC) encoding operation, based on data to be written in the memory device 1100 through the memory interface 1260. The data on which the ECC encoding operation is performed may be transferred to the memory device 1100 through the memory interface 1260. The ECC circuit 1250 may perform ECC decoding on data received from the memory device 1100 through the memory interface 1260. The ECC circuit 1250 may perform an ECC operation, based on Bose, Chaudhuri, and Hocquenghem (BCH) code or Low Density Parity Check (LDPC) code.

The memory interface 1260 may communicate with the memory device 1100 under the control of the CPU 1220. In this embodiment, the memory interface 1260 may queue commands, e.g., normal commands received from the CPU 1220. Also, the memory interface 1260 may set an additional operation time to each of the normal commands. The additional operation time may be set to guarantee the time required to execute the corresponding normal command for a certain time even when the suspend command is received.

Figure 3:
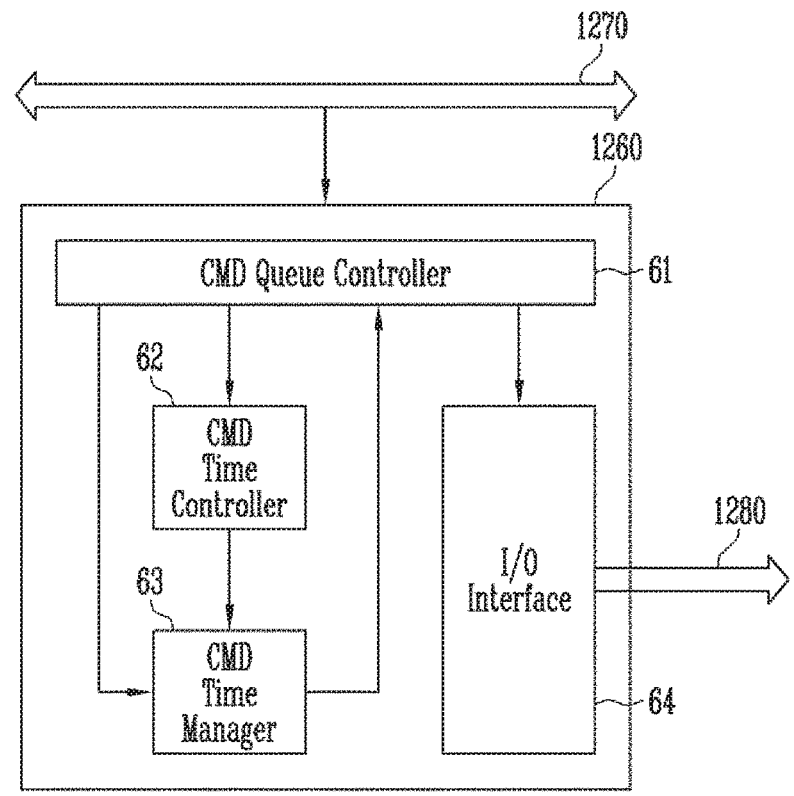
FIG. 3 is a diagram illustrating a memory interface according to an embodiment of the present disclosure.

FIG. 3 is a diagram illustrating a memory interface according to an embodiment of the present disclosure, for example, the memory interface 1260 of FIG. 2.

Referring to FIG. 3, the memory interface 1260 may include a command (CMD) queue controller 61, a CMD time controller 62, a CMD time manager 63, and an input/output (I/O) interface 64.

The CMD queue controller 61 may receive a normal command or a suspend command through a bus 1270. The CMD queue controller 61 may sequentially receive a plurality of normal commands, and queue the normal commands according to an execution order. The CMD queue controller 61 may sequentially output the queued normal commands to the CMD time controller 62. If a suspend command is received, the CMD queue controller 61 may immediately output the suspend command to the CMD time manager 63 regardless of a queuing order of the normal commands.

The CMD time controller 62 may provide an additional operation time to each of the normal commands received from the CMD queue controller 61, and transmit information including the normal commands and the corresponding additional operation time to the CMD time manager 63. Hereinafter, the information is referred to as 'command and time information.'

The CMD time manager 63 may receive the command and time information from the CMD time controller 62, and store an additional operation time matched to each of the normal commands. The CMD time manager 63 may store command and time information on each of the normal command and then output an end signal to the CMD queue controller 61. If the suspend command is received from the CMD queue controller 61, the CMD time manager 63 may output the end signal to the CMD queue controller 61 after the additional operation time elapses according to the command and time information stored therein.

If the end signal is received, the CMD queue controller 61 may transmit a normal command or suspend command corresponding to the end signal to the I/O interface 64. For example, whenever the end signal is received, the CMD queue controller 61 may sequentially output the normal command to the I/O interface 64, or output the suspend command to the I/O interface 64.

The additional operation time and the normal command matched thereto, which are stored in the CMD time manager 63, may be deleted if an operation on the normal command is ended in the memory device 1100.

If a normal command or suspend command is received from the CMD queue controller 61, the I/O interface 64 may output the normal command or suspend command to the memory device 1100 through a channel 1280.

The memory device 1100 may receive the normal command or suspend command from the I/O interface 64 through the channel 1280, and may execute the corresponding command.

The above-described components of the memory interface 1260 will be described in more detail below.

Figure 4:
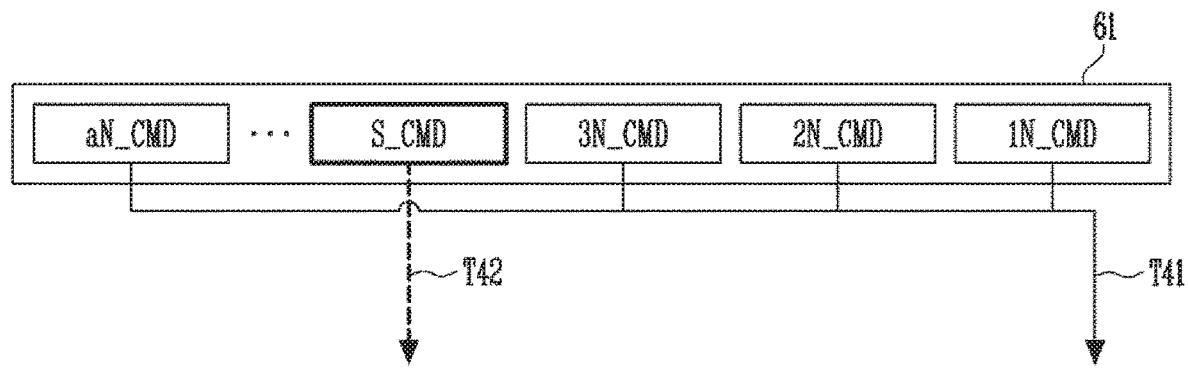
FIG. 4 is a diagram illustrating a command queue controller according to an embodiment of the present disclosure.

FIG. 4 is a diagram illustrating a command queue controller according to an embodiment of the present disclosure, for example, the CMD queue controller 61 of FIG. 3.

Referring to FIG. 4, the CMD queue controller 61 may manage a queue of normal commands 1N_CMD to aN_CMD (where a is a positive integer) received through the bus 1270 of FIG. 3. For example, first to ath normal commands 1N_CMD to aN_CMD received through the bus 1270 may be sequentially output according to a queuing order (T41).

If a suspend command S_CMD having a relatively high importance is received when the first to ath normal commands 1N_CMD to aN_CMD are sequentially output, the CMD queue controller 61 does not output a next normal command but may output the suspend command S_CMD (T42). For example, a normal command received through the bus 1270 may be output to the CMD time controller 62 of FIG. 3. If an end signal is received, the same normal command output to the CMD time controller 62 may be output to the I/O interface 64 of FIG. 3. In addition, if the suspend command S_CMD is received through the bus 1270, the CMD queue controller 61 may output the suspend command S_CMD to the CMD time manager 63 of FIG. 3 instead of the CMD time controller 62. If the end signal is received after the suspend command S_CMD is output to the CMD time manager 63, the CMD queue controller 61 may output the suspend command S_CMD to the I/O interface 64.

Figure 5:
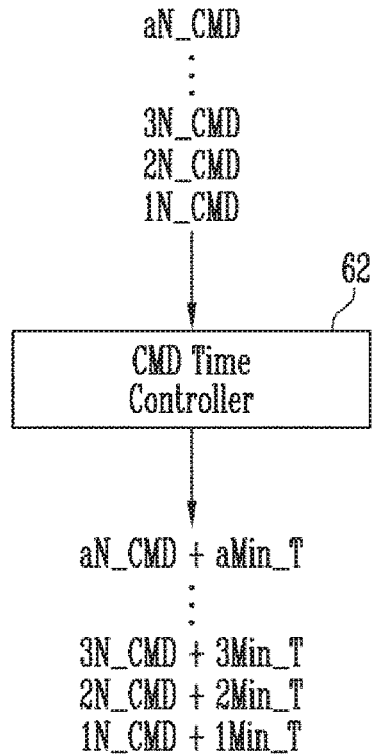
FIG. 5 is a diagram illustrating a command time controller according to an embodiment of the present disclosure.

FIG. 5 is a diagram illustrating a command time controller according to an embodiment of the present disclosure, for example, the CMD time controller 62 of FIG. 3.

Referring to FIG. 5, if the first to ath normal commands 1N_CMD to aN_CMD are received from the CMD queue controller 61 of FIG. 3, the CMD time controller 62 may provide additional operation times 1Min_T to aMin_T respectively to the first to ath normal commands 1N_CMD to aN_CMD. Each of the additional operation times 1Min_T to aMin_T refers to a time for which a currently executed normal command is additionally executed when a suspend command is received.

For example, the CMD time controller 62 may provide first to ath additional operation times 1Min_T to aMin_T respectively to the first to ath normal commands 1N_CMD to aN_CMD. Then, the CMD time controller 62 may sequentially output command and time information (1N_CMD+1Min_T) to (aN_CMD+aMin_T) to which the additional operation times 1Min_T to aMin_T are provided. That is, if the suspend command S_CMD is received when each of the normal commands 1N_CMD to aN_CMD is being executed in the memory device 1100, the additional operation time provided to the normal command may be used to allow the normal command being executed not to be immediately stopped but to be further executed by a set additional operation time.

The additional operation times 1Min_T to aMin_T may be set differently depending on the memory system 1000. For example, the additional operation times 1Min_T to aMin_T may be all set as the same time to the first to ath normal commands 1N_CMD to aN_CMD, or be set as different times. For example, the additional operation times 1Min_T to aMin_T may be set respectively according to characteristics of the first to ath normal commands 1N_CMD to aN_CMD. For example, the additional operation times 1Min_T to aMin_T may be set differently according to importance degrees of the first to ath normal commands 1N_CMD to aN_CMD. For example, the additional operation times 1Min_T to aMin_T may be set to some normal commands according to the first to ath normal commands 1N_CMD to aN_CMD, and may not be set to the other normal commands. The characteristics or importance degrees of the first to ath normal commands 1N_CMD to aN_CMD may be changed depending on the memory system 1000.

Figure 6:
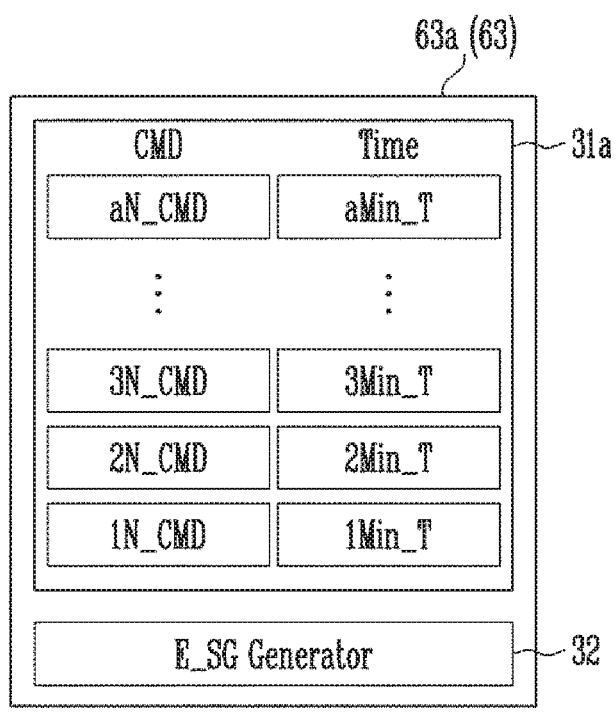
FIGS. 6 and 7 are diagrams illustrating embodiments of a command time manager according to an embodiment of the present disclosure.
Figure 7:
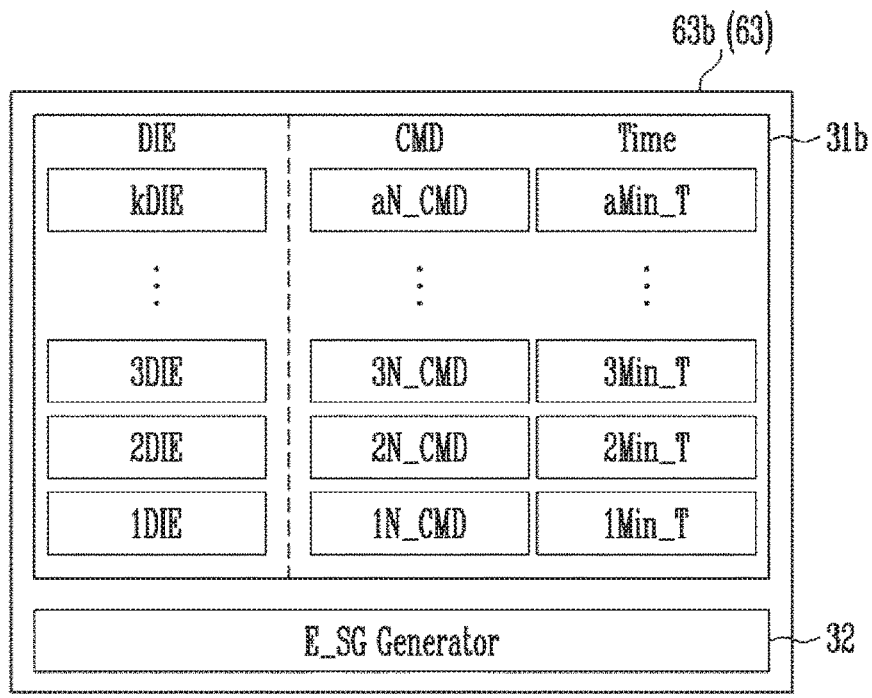

FIGS. 6 and 7 are diagrams illustrating embodiments of a command time manager according to an embodiment of the present disclosure, for example, the CMD time manager 63 of FIG. 3. FIG. 6 is a diagram illustrating a CMD time manager 63a according to an embodiment of the present disclosure, and FIG. 7 is a diagram illustrating a CMD time manager 63b according to another embodiment of the present disclosure.

Referring to FIG. 6, the CMD time manager 63a may include information table 31a and an end signal (E_SG) generator 32.

Data in which CMD information and time information are matched to each other may be stored in the information table 31a. For example, data in which the first normal command 1N_CMD and the first additional operation time 1Min_T are matched to each other may be stored in the information table 31a, and data in which the second normal command 2N_CMD and the second additional operation time 2Min_T are matched to each other may be stored in the information table 31a. In this manner, data in which the ath normal command aN_CMD and the ath additional operation time aMin_T are matched to each other may be stored in the information table 31a.

If information input to the CMD time manager 63a is stored in the information table 31a, the E_SG generator 32 may output an end signal notifying that the information has been stored in the information table 31a.

Referring to FIG. 7, the CMD time manager 63b may include an information table 31b and an end signal (E_SG) generator 32. In the CMD time manager 63b, information stored in the information table 31b is different from that stored in the information table 31a of FIG. 6, and the other components are similar to those of the CMD time manager 63a of FIG. 6.

Data in which die information, CMD information, and time information are matched to one another may be stored in the CMD time manager 63b of FIG. 7. For example, when the memory controller 1200 of FIG. 2 controls a plurality of memory devices 1100, a plurality of channels 1280 may be coupled to the memory interface 1260, and the plurality of memory devices 1100 may be coupled to the respective channels 1280. If each of the memory devices 1100 is a die, a command being executed in each die may be various.

Therefore, in the memory system 1000 having the above-described structure, information on dies DIE may be stored in the CMD time manager 63b. For example, data in which a first die 1DIE, the first normal command 1N_CMD, and the first additional operation time 1Min_T are matched to one another may be stored in the information table 31b. When a command CMD being executed in the first die 1DIE is the first normal command 1N_CMD, the first additional operation time 1Min_T may be provided and stored in the first normal command 1N_CMD. In this case, if a suspend command for the first die 1DIE is received, the first normal command 1N_CMD is not immediately ended, but may be ended after the first normal command 1N_CMD is further executed by the first additional operation time 1Min_T. In this manner, when a command CMD being executed in an ath die aDIE is the ath normal command aN_CMD, the ath additional operation time aN_CMD may be provided and stored in the ath normal command aN_CMD.

If information input to the CMD time manager 63b is stored in the information table 31b, the E_SG generator 32 may output an end signal notifying that the information has been stored in the information table 31b.

Figure 8:
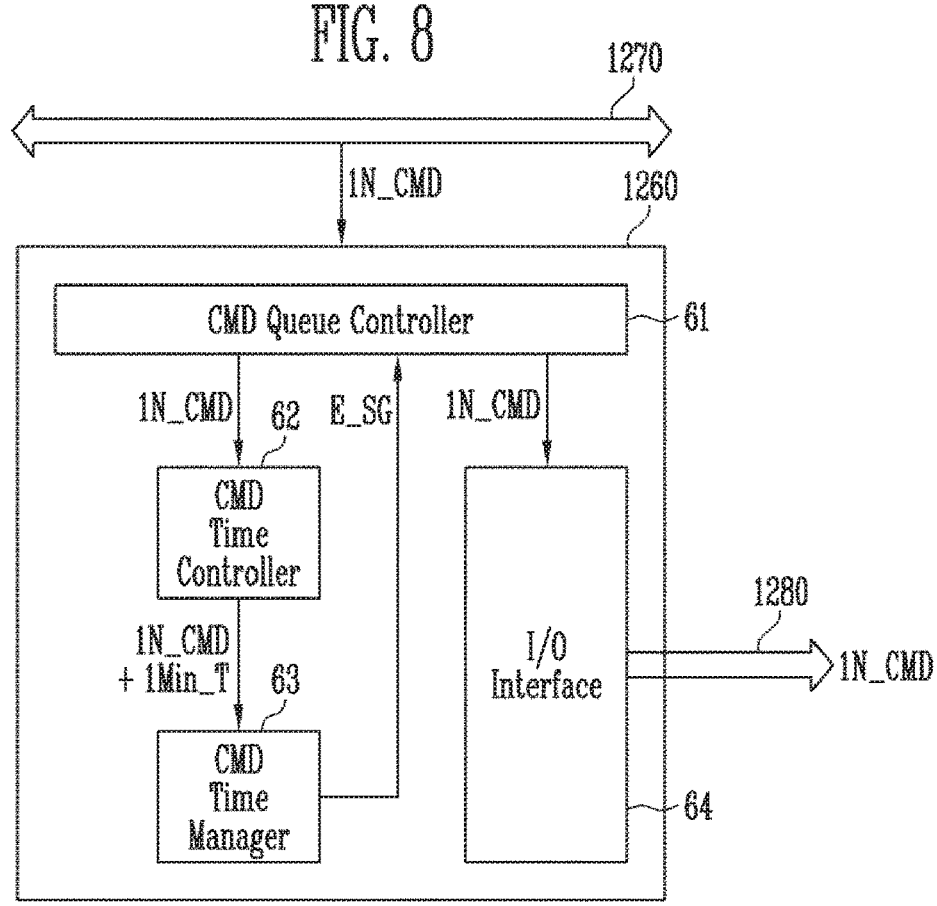
FIG. 8 is a diagram illustrating a method for executing a normal command according to an embodiment of the present disclosure.

FIG. 8 is a diagram illustrating a method for executing a normal command according to an embodiment of the present disclosure.

Referring to FIG. 8, if the memory interface 1260 receives the first normal command 1N_CMD through the bus 1270, the CMD queue controller 61 may temporarily store the first normal command 1N_CMD therein. Subsequently, the CMD queue controller 61 may transmit the first normal command 1N_CMD to the CMD time controller 62.

The CMD time controller 62 may provide the first additional operation time 1Min_T to the first normal command 1N_CMD, and output first command and time information (1N_CMD+1Min_T) on the first normal command 1N_CMD.

The first command and time information (1N_CMD+1Min_T) output from the CMD time controller 62 may be input to the CMD time manager 63. If the first command and time information (1N_CMD+1Min_T) is stored in the CMD time manager 63, the CMD time manager 63 may output an end signal E_SG to the CMD queue controller 61.

If the end signal E_SG is received, the CMD queue controller 61 may transmit the temporarily stored first normal command 1N_CMD to the I/O interface 64.

The I/O interface 64 may transmit the first normal command 1N_CMD received from the CMD queue controller 61 to the memory device 1100 of FIG. 2 through the channel 1280.

If the first normal command 1N_CMD is received through the channel 1280, the memory device 1100 may execute the first normal command 1N_CMD.

A case in which a suspend command is generated while the memory device 1100 is executing the first normal command 1N_CMD will be described below.

Figure 9:
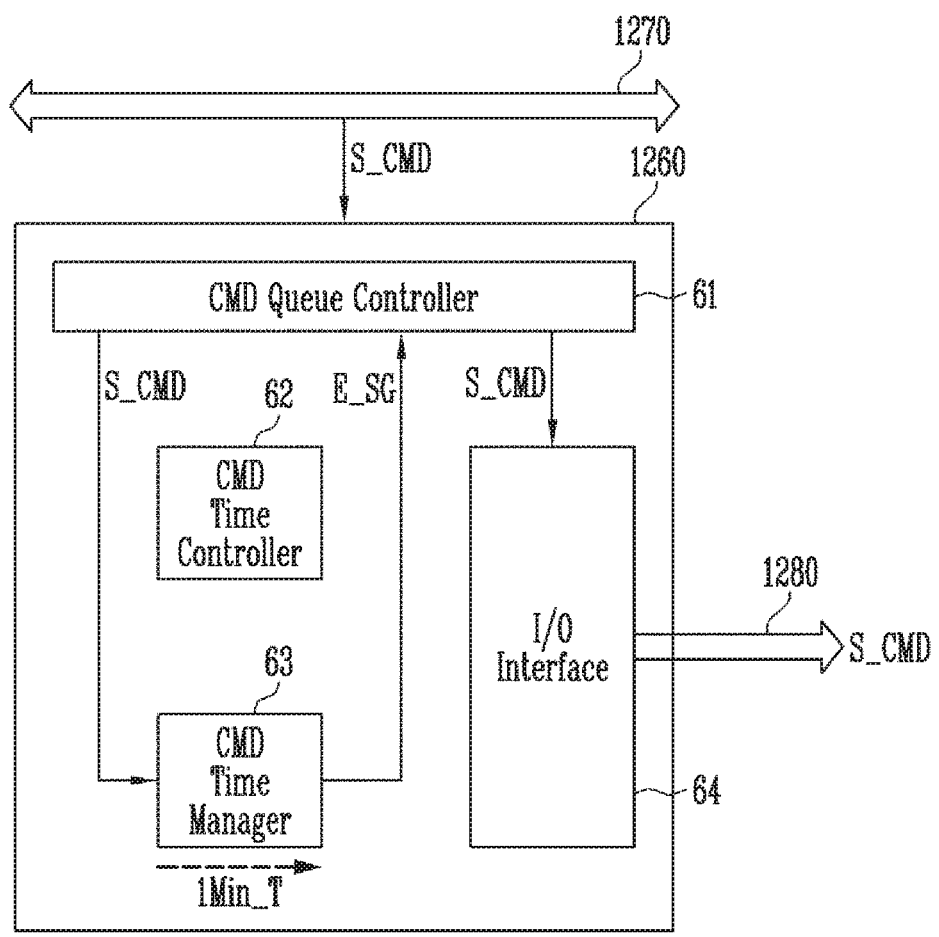
FIG. 9 is a diagram illustrating a method for executing a suspend command according to an embodiment of the present disclosure.

FIG. 9 is a diagram illustrating a method for executing a suspend command according to an embodiment of the present disclosure.

Referring to FIG. 9, if the memory interface 1260 receives a suspend command S_CMD through the bus 1270, the CMD queue controller 61 may temporarily store the suspend command S_CMD therein. Subsequently, the CMD queue controller 61 may search for a normal command being currently executed in the memory device 1100, and transmit the searched suspend command S_CMD to the CMD time manager 63.

If the CMD time manager 63 receives the suspend command S_CMD, it may be determined whether an additional operation time matched to the normal command exists in normal command information.

If information on an additional operation time does not exist, the CMD time manager 63 may immediately output an end signal E_SG. If information on an additional operation time does exist, the CMD time manager 63 may output the end signal E_SG after a time is delayed by the corresponding additional operation time. For example, when the memory device 1100 executes the first normal command 1N_CMD, and the first additional operation time 1Min_T is matched to the first normal command 1N_CMD, the CMD time manager 63 may output the end signal E_SG after the first additional operation time 1Min_T elapses.

Accordingly, although the suspend command S_CMD is generated, the memory device 1100 does not immediately end an operation of the first normal command 1N_CMD being currently executed, but can further perform the corresponding operation for the first additional operation time 1Min_T.

If the CMD time manager 63 outputs an end signal E_SG, the output end signal E_SG may be input to the CMD queue controller 61.

If the end signal E_SG is received, the CMD queue controller 61 may transmit the temporarily stored suspend command S_CMD to the I/O interface 64.

The I/O interface 64 may transmit the suspend command S_CMD received from the CMD queue controller 61 to the memory device 1100 through the channel 1280.

According to the embodiment described above, an additional operation time is provided to a normal command, so that it is possible to guarantee a minimum time for which the normal command can be additionally executed even when a suspend command is generated. Accordingly, it is possible to prevent a phenomenon that the normal command is infinitely delayed.

Figure 10:
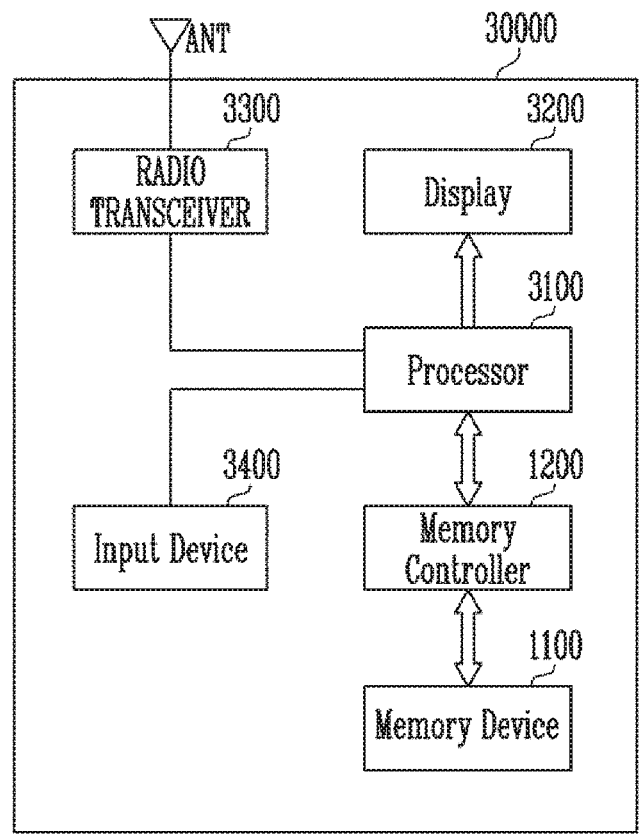
FIG. 10 is a diagram illustrating a memory system including a memory controller and a memory device according to an embodiment of the present disclosure.

FIG. 10 is a diagram illustrating an embodiment of a memory system, for example, a memory system 30000 including the memory controller 1200 and the memory device 1100, shown in FIG. 2.

Referring to FIG. 10, the memory system 30000 may be implemented as a cellular phone, a smart phone, a tablet personal computer (PC), a personal digital assistant (PDA), or a wireless communication device. The memory system 30000 may include the memory device 1100 and the memory controller 1200 capable of controlling an operation of the memory device 1100. The memory controller 1200 may control a data access operation of the memory device 1100, e.g., a program operation, an erase operation, a read operation, or to the like under the control of a processor 3100.

Data programmed in the memory device 1100 may be output through a display 3200 under the control of the memory controller 1200.

A radio transceiver 3300 may transmit and/or receive radio signals through an antenna ANT. For example, the radio transceiver 3300 may convert a radio signal received through the antenna ANT into a signal that can be processed by the processor 3100. Therefore, the processor 3100 may process a signal output from the radio transceiver 3300 and transmit the processed signal to the memory controller 1200 or the display 3200. The memory controller 1200 may transmit the signal processed by the processor 3100 to the memory device 1100. Also, the radio transceiver 3300 may convert a signal output from the processor 3100 into a radio signal, and output the converted radio signal to an external device through the antenna ANT. An input device 3400 is a device capable of inputting a control signal for controlling an operation of the processor 3100 or data to be processed by the processor 3100, and may be implemented as a pointing device such as a touch pad or a computer mount, a keypad, or a keyboard. The processor 3100 may control an operation of the display 3200 such that data output from the memory controller 1200, data output from the radio transceiver 3300, or data output from the input device 3400 can be output through the display 3200.

In various embodiments, the memory controller 1200 capable of controlling an operation of the memory device 1100 may be implemented as a part of the processor 3100, or be implemented as a chip separate from the processor 3100.

Figure 11:
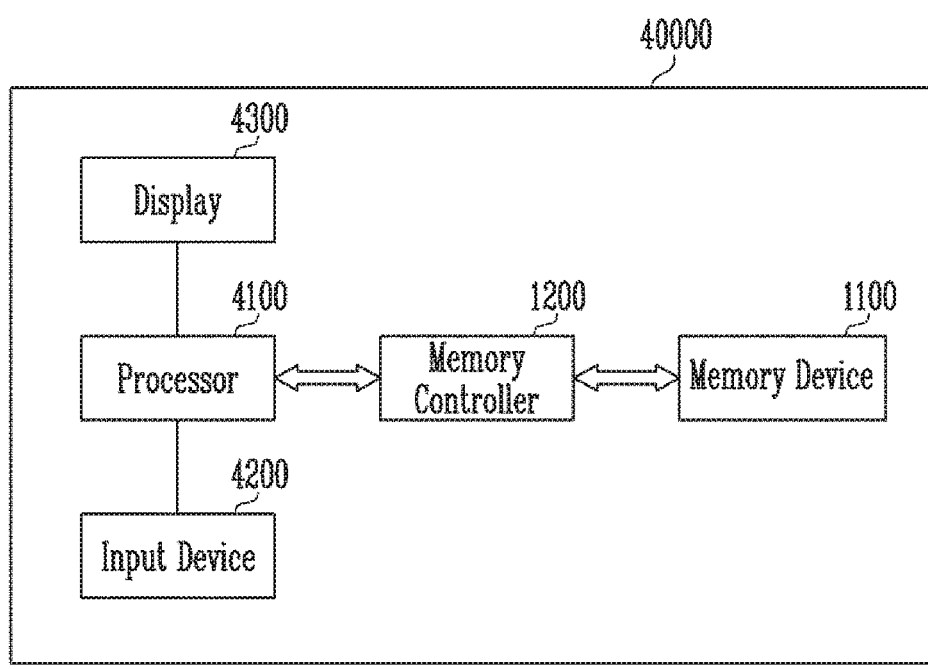
FIG. 11 is a diagram illustrating a memory system including a memory controller and a memory device according to an embodiment of the present disclosure.

FIG. 11 is a diagram illustrating an embodiment of a memory system according to an embodiment of the present disclosure, for example, a memory system 40000 including the memory controller 1200 and the memory device 1100, shown in FIG. 2.

Referring to FIG. 11, the memory system 40000 may be implemented as a personal computer (PC), a tablet PC, a net-book, an e-reader, a personal digital assistant (PDA), a portable multimedia player (PMP), an MP3 player, or an MP4 player.

The memory system 40000 may include the memory device 1100 and the memory controller 1200 capable of controlling a data processing operation of the memory device 1100.

A processor 4100 may output data stored in the memory device 1100 through a display 4300 according to data input through an input device 4200. For example, the input device 4200 may be implemented as a pointing device such as a touch pad or a computer mouse, a keypad, or a keyboard.

The processor 4100 may control overall operations of the memory system 40000, and control an operation of the memory controller 1200. In various embodiments, the memory controller 1200 capable of controlling an operation of the memory device 1100 may be implemented as a part of the processor 4100, or be implemented as a chip separate from the processor 4100.

Figure 12:
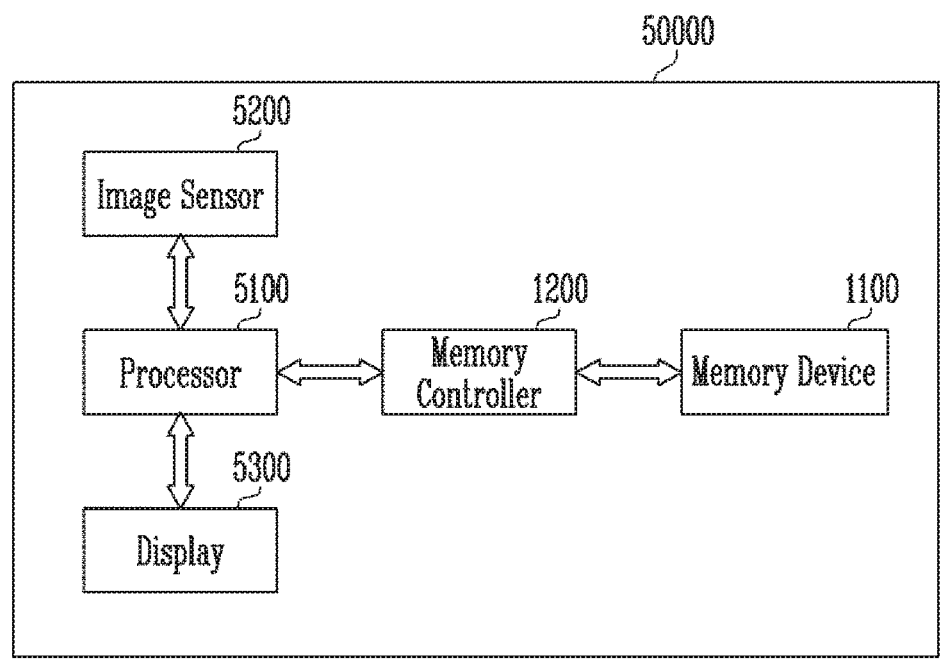
FIG. 12 is a diagram illustrating a memory system including a memory controller and a memory device according to an embodiment of the present disclosure.

FIG. 12 is a diagram illustrating an embodiment of a memory system according to an embodiment of the present disclosure, for example, a memory system 50000 including the memory controller 1200 and the memory device 1100, shown in FIG. 2.

Referring to FIG. 12, the memory system 50000 may be implemented as an image processing device, e.g., a digital camera, a mobile terminal having a digital camera attached thereto, a smart phone having a digital camera attached thereto, or a tablet PC having a digital camera attached thereto.

The memory system 50000 may include the memory device 1100 and the memory controller 1200 capable of controlling a data processing operation of the memory device 1100, e.g., a program operation, an erase operation, or a read operation.

An image sensor 5200 of the memory system 50000 may convert an optical image into digital signals. The converted digital signals may be transmitted to a processor 5100 or the memory controller 1200. Under the control of the processor 5100, the converted digital signals may be output through a display 5300, or be stored in the memory device 1100 through the memory controller 1200. In addition, data stored in the memory device 1100 may be output through the display 5300 under the control of the processor 5100 or the memory controller 1200.

In various embodiments, the memory controller 1200 capable of controlling an operation of the memory device 1100 may be implemented as a part of the processor 5100, or be implemented as a chip separate from the processor 5100.

Figure 13:
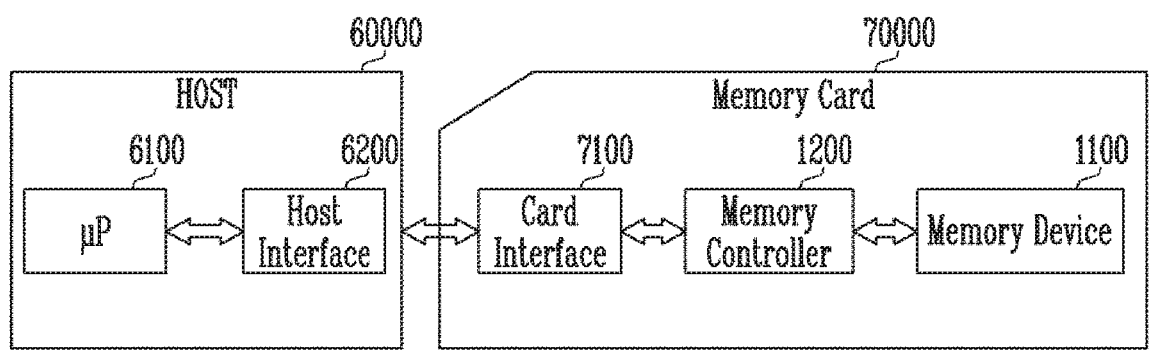
FIG. 13 is a diagram illustrating a memory system including a memory controller and a memory device according to an embodiment of the present disclosure.

FIG. 13 is a diagram illustrating an embodiment of a memory system according to an embodiment of the present disclosure, for example, a memory system 70000 including the memory controller 1200 and the memory device 1100, shown in FIG. 2.

Referring to FIG. 13, the memory system 70000 may be implemented as a memory card or a smart card. The memory system 70000 may include the memory device 1100, the memory controller 1200, and a card interface 7100.

The memory controller 1200 may control data exchange between the memory device 1100 and the card interface 7100. In various embodiments, the card interface 7100 may be a secure digital (SD) card interface or a multi-media card (MMC) interface, but the present disclosure is not limited thereto.

The card interface 7100 may interface data exchange between a host 60000 and the memory controller 1200 according to a protocol of the host 60000. In various embodiments, the card interface 7100 may support a universal serial bus (USB) protocol and an inter-chip (IC)-USB protocol. Here, the card interface 7100 may mean hardware capable of supporting a protocol used by the host 60000, software embedded in the hardware, or a signal transmission scheme.

When the memory system 70000 is coupled to a host interface 6200 of the host 60000 such as a personal computer (PC), a tablet PC, a digital camera, a digital audio player, a cellular phone, console video game hardware, or a digital set-top box, the host interface 6200 may perform data communication with the memory device 1100 through the card interface 7100 and the memory controller 1200 under the control of a microprocessor (μP) 6100.

According to the present disclosure, when a suspend command is to be executed, the suspend command is executed after a currently executed normal command is additionally executed by a preset operation time, so that it is possible to prevent a phenomenon that the execution of the normal command is continuously delayed due to the suspend command.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory interface comprising:
   a command queue controller configured to determine an execution order of normal commands and a suspend command;
   a command time controller configured to receive the normal commands, and output command and time information by providing a corresponding additional operation time to each of the normal commands;
   a command time manager configured to match the command and time information to each of the normal commands to be stored therein, and output an end signal after the additional operation time matched to each of the normal commands elapses when the suspend command is received; and
   an input/output interface configured to receive the normal commands and the suspend command, and transmit the normal commands and the suspend command to a memory device through a channel.

2. The memory interface of claim 1, wherein the command queue controller:
   if the normal commands are received, temporarily stores the normal commands;
   sequentially transmits the normal commands to the command time controller; and
   sequentially transmits the normal commands to the input/output interface in response to the end signal.

3. The memory interface of claim 1, wherein the command queue controller:
   sequentially outputs the normal commands to the command time controller; and
   then sequentially transmits the normal commands to the input/output interface whenever the end signal is received.

4. The memory interface of claim 1, wherein, if the suspend command is received, the command queue controller first outputs the suspend command regardless of an output order of the normal commands.

5. The memory interface of claim 1, wherein the command queue controller:
   sequentially transmits the normal commands to the command time controller, if the normal commands are received; and
   transmits the suspend command to the command time manager, if the suspend command is received.

6. The memory interface of claim 1, wherein the command time controller provides the additional operation times respectively according to characteristics or importance degrees of the normal commands.

7. The memory interface of claim 6, wherein the command time controller:
   provides the same additional operation time to all of the normal command; or
   provides the additional operation time to some of the normal commands, and does not provide the additional operation time to the other normal commands.

8. The memory interface of claim 7, wherein the command time controller provides or does not provide the additional operation times according to the characteristics or importance degrees of the normal commands.

9. The memory interface of claim 1, wherein the command time manager includes:
   an information table configured to store command and time information in which the additional operation times are respectively matched to the normal commands; and
   an end signal generator configured to output the end signal whenever the command and time information is stored in the information table.

10. A memory controller comprising:
    a central processing unit configured to generate a normal command and a suspend command in response to a request from a host; and
    a memory interface configured to transmit the normal command or the suspend command to a memory device, wherein the memory interface:
when the normal command is received, provides an additional operation time to the normal command and transmits the normal command to the memory device; and
when the suspend command is received during execution of the normal command, executes the normal command for the additional operation time and then transmits the suspend command to the memory device.

11. The memory controller of claim 10, wherein the memory interface includes:
a command queue controller configured to control an output order of the normal command and the suspend command;
a command time controller configured to provide the additional operation time according to the normal command;
a command time manager configured to store information in which the additional operation time is matched to the normal command, and delay the suspend command for the additional operation time, if the suspend command is received; and
an input/output interface configured to transmit the normal command or the suspend command, which is received from the command queue controller, to the memory device.

12. The memory controller of claim 11, wherein the command queue controller:
stores the normal command and transmits the stored normal command to the command time controller, if the normal command is received; and
stores the suspend command and transmits the stored suspend command to the command time manager, if the suspend command is received.

13. The memory controller of claim 11, wherein the command time controller provides the additional operation time according to a characteristic or importance degree of the normal command.

14. The memory controller of claim 11, wherein the command time controller provides or does not provide the additional operation time according to the characteristic or importance degree of the normal command.

15. The memory controller of claim 11, wherein the command time manager includes:
an information table configured to store command and time information in which the additional operation time is matched to the normal command; and
an end signal generator configured to output the end signal whenever the command and time information is stored.

16. The memory controller of claim 11, wherein, if the suspend command is received, the command time manager delays the suspend command for the additional operation time matched to the normal command, and outputs the end signal after the additional operation time elapses.

17. A memory system comprising:
a memory device configured to store data; and
a memory controller configured to generate a normal command or a suspend command in response to a request from a host, and transmit the normal command or the suspend command to the memory device through a channel,
wherein the memory controller:
provides an additional operation time to the normal command and then transmits the normal command to the memory device, when the normal command is generated; and
delays the suspend command for the additional operation time matched to the normal command and then transmits the suspend command to the memory device, when the suspend command is generated.

18. The memory system of claim 17, wherein the memory controller provides the additional operation time according to a characteristic or importance degree of the normal command.

19. The memory system of claim 17, wherein the memory controller:
if the suspend command is generated while the normal command is being executed in the memory device, delays the output of the suspend command such that the normal command is further executed for the additional operation time in the memory device; and
if the additional operation time elapses, transmits the suspend command to the memory device.

* * * * *